United States Patent Office 3,117,115
Patented Jan. 7, 1964

3,117,115
AQUEOUS AMMONIACAL SOLUTION OF LIGNIN AND PREPARATION THEREOF
David Webster, North Charleston, S. C., assignor to West Virginia Pulp and Paper Company, New York, N.Y., a corporation of Delaware
No Drawing. Filed Mar. 23, 1961, Ser. No. 97,720
5 Claims. (Cl. 260—124)

This invention relates to improved methods for preparing aqueous ammoniacal solutions of alkali lignin.

It is often desirable in the utilization of alkali lignin that the lignin be employed in the form of an aqueous ammoniacal solution. For example, U.S. Patent No. 2,664,377 discloses the use of ammoniacal solutions of lignin for binding lignocellulosic fiber products. In addition, in the employment of lignin-phenolic resole resins for the bonding of glass or mineral fibers, the use of alkali metal hydroxides to obtain low concentration solutions of the lignin in the aqueous solvent has a deleterious effect on the glass or mineral fiber. Consequently, for this use, it is desirable to employ ammonia rather than alkali as the lignin solubilizing agent. Aqueous ammoniacal solutions of alkali lignin, however, are very difficult to prepare. If the alkali lignin is added to an aqueous ammoniacal solution at ambient temperatures, an extremely high quantity of ammonia is required to obtain solution. By adding the lignin to the ammonia solution, it is impossible to obtain solution of the lignin by employing less than 3 moles of ammonia per mole of lignin and, from a practical standpoint of obtaining solution in a reasonable length of time, at least 8 to 10 moles of ammonia per mole of lignin is required. (The molecular weight of lignin as used herein is based on an assumed average value of 840.) Solutions prepared using ammonia/lignin ratios of over 8/1 are extremely viscous and solutions having solids contents much above 20% cannot be practically employed due to this high viscosity. Furthermore, due to the high ammonia content of these solutions, any subsequent heating step, such as shown in 2,664,377, will liberate large quantities of ammonia creating problems in the ventilation of the obnoxious fumes. Solubilization of the lignin in the ammonia solution cannot be aided by the application of heat as this merely releases the ammonia before it can react with the lignin to form the soluble salt.

It is, consequently, the primary object of this invention to provide an improved method of rapidly and easily preparing aqueous ammoniacal solutions of alkali lignin whereby a minimum quantity of ammonia may be employed to attain the solution.

Briefly, this object can be obtained by preparing a slurry of the alkali lignin in water, heating the lignin slurry to a temperature over about 70° C., but below 100° C., and introducing the ammonia into the heated lignin slurry. Above 100° C. the boiling of the water causes rapid evolution of the ammonia with the steam produced and interferes with the formation of the lignin salt. Some problem with this has been observed at temperatures above 90° C. and for this reason it is preferred to employ temperatures below 90° C. and most preferably in the neighborhood of about 80° C. By employing this procedure solutions have been prepared employing as little as 1.6 moles of ammonia per mole of lignin. As solution can be had at low ammonia contents and as the viscosity of aqueous ammoniacal lignin solutions is dependent upon the quantity of ammonia present, solutions of relatively low viscosity and high solids can be obtained. Once solution of the alkali lignin has been obtained, the solution is very stable even at low temperatures, i.e., the solution although containing only a small fraction of the ammonia which would be required to obtain solution at room temperature will retain the lignin in solution at ambient temperatures. Evidently under the condition where the ammonia is added to the lignin at a temperature above 70° C., the reaction rate between the lignin and the ammonia to form the salt exceeds the rate at which the ammonia tends to escape from the solution due to volatilization.

The lignin slurry can easily be prepared by adding the free acid alkali lignin to water with good agitation. Some care should be used in adding the lignin slowly and not dumping in large quantities at one time as this causes lumping of the lignin particles and requires additional time to break up these lumps to form a uniform slurry. The quantity of lignin slurried in the water will be dependent upon the solids content desired in the final solution. Not more than about 30 parts by weight of lignin should be slurried in 70 parts of water because of the extremely high viscosity of solutions above 30% solids. Because of the viscosity problem, it is preferred that less than about 20 to 25 parts of lignin be added to 75 to 80 parts of water.

After a uniform slurry has been produced, the temperature of the slurry is raised to at least 70° C. This heating can be accomplished either by indirect heating of the slurry through the walls of the vessel containing the slurry or by direct heating such as by passing steam through the slurry, or by use of immersed heating coils. During this heating phase, agitation of the slurry should be maintained to keep the lignin particles in suspension. Whatever method is employed, heating of the slurry should be conducted in a manner to avoid localized over heating of the slurry which may result in fusion of the lignin particles and consequent retardation of the subsequent solution of the lignin in the ammonia. Localized overheating most commonly will be caused by insufficient agitation which permits the lignin to settle on the heating surfaces or the use of high temperature steam. Hardwood lignins have lower fusion temperatures than pine lignins and consequently need greater care in their handling. Soda lignins have lower fusion temperatures than kraft lignins and likewise should be handled with greater care. With reasonable caution, however, heating the slurry to within the temperature range of 70 and 100° C. will not result in any appreciable fusion of even the lowest melting of the alkali lignins.

Alternately, instead of separately preparing a slurry of the lignin particles in cold water and then heating to the desired temperature, a slurry can be prepared by adding the lignin to water which has been previously heated to a temperature in the neighborhood of that desired for the addition of the ammonia. Preferably the water should be heated slightly hotter than that desired for the final slurry as there will be some decrease in the water temperature during addition of the lignin due to the heat required to increase the temperature of the lignin. By this method, as soon as a uniform slurry has been obtained, it is ready for the addition of ammonia to produce the solution.

In adding the ammonia to the heated lignin slurry, the ammonia either in the form of anhydrous ammonia or as a solution should be introduced beneath the surface of the heated lignin slurry. This causes any free ammonia to pass through a depth of the slurry providing opportunity for reaction with the lignin before diffusion of the residual ammonia to the surface. It has been found that it is generally desirable to release the ammonia into the slurry at a depth approximately equal to or greater than the diameter of the tank or container holding the slurry. Constant agitation of the slurry should be maintained during the addition of the ammonia, not only to maintain the lignin in suspension but also to provide increased contact between the ammonia entering the slurry and the lignin. Some care should be exercised in providing the agitation to avoid the entrainment air into the slurry which will greatly decrease the adsorption efficiency of the ammonia. Thus rapid agitation which produces a vortex and causes entrainment of air in the slurry should be avoided.

A preferred method of introducing ammonia into the heated slurry, and this method is particularly desirable in preparing large quantities of solution, is to have a large tank containing the heated slurry with an inlet and outlet pipe beneath the level of the slurry, preferably at opposite sides of the tank near the bottom. The inlet and outlet pipes are connected directly to each other with a pump. By such an arrangement, the slurry can be constantly recirculated providing the necessary agitation to maintain the slurry in suspension. Between the tank outlet pipe and the pump, a coupling is arranged through which ammonia solution can be introduced into the lignin solution circulating through the pipe line. The ammonia, by such an arrangement, is added to the circulating slurry in the pipes until solution is obtained. This method has the advantage of producing solutions of lignin at very low ammonia to lignin usage.

Another preferred method is to employ an eductor through which heated lignin slurry is passed. The ammonia is introduced into the hot slurry at the eductor and maintained in contact with the slurry under turbulent flow conditions for a sufficient length of time to provide solution. The time of contact may be provided for by use of a desired length of pipe under slight pressure to prevent flashing of the ammonia.

Desirably, the quantity of ammonia which is added to the lignin to obtain solution should be as low as possible in order to obtain the benefits of low viscosity and high concentration solutions. The preferred range to obtain these types of solutions is 1.5 to 3 moles of ammonia per mole of lignin. However, higher quantities of ammonia can be employed with the benefits of obtaining solutions more easily compared to heretofore used methods. The differences in various lignin solutions prepared with different quantities of ammonia are illustrated in the following table. This table shows the quantity of ammonia in the solution in moles of ammonia per mole of lignin and the viscosity of the solution at 25% solids.

TABLE 1

| Molar ratio of ammonia to lignin: | Viscosity at 25° C. at 25% solids, cp. |
|---|---|
| 1.6:1 | 700 |
| 2.0:1 | 2,300 |
| 3.0:1 | 11,000 |

The following examples are given to specifically illustrate methods of preparing aqueous ammoniacal solutions according to this invention.

*Example 1*

185.7 grams of free acid alkali lignin recovered from the sulfate pulping of pine wood (180 grams dry weight) were slurried into 593.4 grams of water with good agitation. The agitation was continued while the slurry was heated indirectly in a resin flask to approximately 80° C. 20.9 grams of a 28% ammonia solution were slowly introduced into the heated slurry at a point about 6 inches below the surface of the slurry through a pipette. The solution produced had a solids content of approximately 22.5%, a molar ratio of ammonia to lignin of 1.6 to 1 and a pH of 9.8. The viscosity of the solution at 25° C. was found to be 32 centipoises.

*Example 2*

4000 grams of free acid alkali lignin recovered from the sulfate pulping of pine wood were slurried into 12,000 grams of cold water by slowly adding the lignin to the water with good agitation. The cold slurry was placed in a container having a steam coil and inlet and outlet pipes connected through a pump for continuously circulating the slurry. Both the inlet and outlet pipes were so arranged as to draw suction and discharge near the bottom of the slurry. Immediately preceding the pump was a T so designed as to permit the introduction of ammonia to the slurry circulating through the pump. The slurry was heated to approximately 90° C. by means of the steam coil and the pump started. 650 ml. of a 28% ammonia solution was then slowly added to the recirculating slurry over a period of 80 minutes. The solution produced had a solids content of approximately 24.1% solids, an ammonia to lignin molar ratio of approximately 2.24 to 1 and a viscosity at 26.5° C. of 127 centipoises.

I claim:

1. The method of preparing an aqueous ammoniacal solution of alkali lignin which comprises introducing ammonia into an aqueous slurry of alkali lignin particles which is at a temperature between 70 and 100° C.

2. The method of claim 1 wherein the quantity of ammonia introduced into the heated lignin slurry is between approximately 1.5 to 3 moles of ammonia per mole of lignin.

3. The aqueous ammoniacal alkali solution produced by the method of claim 2.

4. The method which comprises passing a heated slurry of alkali lignin particles in water at a temperature between about 70 and 100° C. through a fluid conductor under conditions of turbulent flow, introducing ammonia into the lignin slurry and maintaining the slurry of lignin and ammonia in contact with each other for a time sufficient for the ammonia to react with all the lignin to produce the water soluble ammoniacal salt of lignin and a uniform solution.

5. The method which comprises preparing a heated aqueous slurry of alkali lignin particles at a temperature between 70 and 100° C. in a container, continuously removing from the container a small portion of the slurry through an enclosed conduit, introducing ammonia into the portion of the slurry in the enclosed conduit and continuously returning the slurry having the ammonia introduced therein to the slurry in the container.

References Cited in the file of this patent

UNITED STATES PATENTS

| 2,201,797 | Scott | May 21, 1940 |
| 2,716,613 | Schoen | Aug. 30, 1955 |